United States Patent [19]

De Forges de Parny et al.

[11] Patent Number: 5,275,359
[45] Date of Patent: Jan. 4, 1994

[54] HELICOPTER-CARRIED NACELLE AND PROCESS FOR REPLACING A SLEEVE ON AN OVERHEAD CABLE

[75] Inventors: Robert De Forges de Parny, Cadolive; Gérard Moudin, Albertville; Philippe Ruaux, Rognac, all of France

[73] Assignee: Electricite de France Service National, France

[21] Appl. No.: 874,591

[22] Filed: Apr. 27, 1992

[30] Foreign Application Priority Data

Apr. 29, 1991 [FR] France .................. 91 05257

[51] Int. Cl.$^5$ .............................................. B64D 9/00
[52] U.S. Cl. ...................... 244/118.1; 254/134.3 R; 182/142; 182/152; 294/81.51; 294/82.25
[58] Field of Search .............. 244/118.5, 118.1, 137.4, 244/137.1, 1; 14/69.3; 104/112, 87; 102/14, 187, 222, 129, 150, 132, 141, 145, 142, 152, 2; 254/134.3; 294/81.51, 81.29

[56] References Cited

U.S. PATENT DOCUMENTS

| | | | |
|---|---|---|---|
| 1,957,451 | 5/1934 | Fitch | 294/81.51 |
| 3,556,580 | 1/1971 | Bridge | 294/81.51 |
| 3,615,116 | 10/1971 | Rosenthal et al. | 294/82.29 |
| 3,810,671 | 5/1974 | Jeffery | 294/82.29 |
| 3,907,066 | 9/1975 | Newton | 182/152 |
| 4,422,528 | 12/1983 | Patterson . | |
| 4,673,039 | 6/1987 | Kurtgis | 182/142 |

*Primary Examiner*—Galen L. Barefoot
*Attorney, Agent, or Firm*—Pearne, Gordon, McCoy & Granger

[57] ABSTRACT

The nacelle (2) permits the rapid replacement of a coupling sleeve (38) between two portions of an overhead cable (1) without depositing said cable on the ground. The nacelle (2) is a metal structure carrying operators and tools. It is suspended on a helicopter, which positions it against the overhead cable (1) and maintains it throughout the change operation for the sleeve (38). By using a force take-up jack (40) at the ends of the sleeve (38), it is possible to replace said sleeve (38) or carry out other operations with respect to this point of the cable (1). The nacelle (2) has pyrotechnic jettisoning or release means. Application to the replacement of sleeves on overhead cables.

7 Claims, 4 Drawing Sheets

HELICOPTER-CARRIED NACELLE AND PROCESS FOR REPLACING A SLEEVE ON AN OVERHEAD CABLE

FIELD OF THE INVENTION

The invention relates to the maintenance and repair of overhead cables, such as the electric cables of public power distribution networks. The invention is particularly appropriate for the replacement of coupling sleeves between two sections of an overhead cable. The invention is also applicable to the cables of transportation means, such as cable railways and the cars carried by such cables. The invention indirectly relates to helicopter carrying.

PRIOR ART

Once installed, most overhead cables require numerous repair and maintenance operations. Thus, within the framework of the maintenance and repair programs of the public power distribution network, Electricité de France has to carry out numerous interventions. For example, the replacement of a coupling sleeve between two overhead cable sections requires the placing of the cable on the ground in order to carry out repairs and then reinstall the cable suspended between two pylons. Such an intervention is extremely long and expensive.

The invention aims at facilitating, improving and speeding up such operations on any type of overhead cable.

SUMMARY OF THE INVENTION

To this end, a first object of the invention is a helicopter-carried nacelle for use in repairing or maintaining an overhead cable and which is constituted by a metal structure having at least one floor on which can move about one or more operators, means for securing the metal structure to a helicopter, means for positioning the nacelle with respect to the overhead cable and in which the nacelle is constantly suspended on the helicopter. The latter maintains the nacelle in place against the cable throughout the operation.

The preferred construction of the nacelle according to the invention provides for the positioning means to be constituted by at least one upwardly inclined guide bar and placed laterally of the metal structure in order to bring the cable to the bottom of a recess by the vertical pulling of the helicopter on the nacelle.

Preferably, the metal structure has a parallelepipedic shape, whereof at least one end side wall is mounted so as to pivot at its lower end so that it can be tilted in the extension of the floor in order to extend the latter. In this case, it is preferable to use positioning cables for locking in a horizontal position the end side walls with respect to the metal structure.

According to a feature of the invention, the metal structure is completed by an upper chassis comprising securing means in the form of rings and on which are fixed the slings of a helicopter rope, means for the pyrotechnic separation of the metal structure from the upper chassis and means for securing operators to the upper chassis in the case of the jettisoning of the metal structure.

The preferred construction of the upper chassis provides for the fixing of the metal structure to the chassis using internal tie rods placed in vertical posts of the metal structure and whose upper end is fixed in a corner of the upper structure and within which are located the pyrotechnic separating means constituted by a pyrotechnic bolt. Preferably, the pyrotechnic bolt control means are constituted by a pyrotechnic cord connected to the helicopter.

In order to facilitate the repairs carried out with the nacelle according to the invention, the latter has a carriage or trolley horizontally displaceable in the metal structure and serving as a cable work table for the operators in the nacelle.

A second main object of the invention is a process for changing a coupling sleeve between two overhead cable sections comprising positioning by the helicopter a nacelle close to the cable and maintaining the nacelle wedged below the cable by vertical pulling, fixing a force take-up jack to the cable at the ends of the sleeve to be replaced, slightly tensioning the cable by means of the force take-up jack in order to detension the cable at the sleeve, dismantling the used sleeve, fitting a new sleeve, detensioning the cable by releasing the force take-up jack and freeing the nacelle from the cable and removing it.

LIST OF DRAWINGS

The detailed description of the invention is accompanied by several drawings, wherein show:

FIG. 1 The use of the nacelle according to the invention for the replacement of a coupling sleeve on an overhead cable.

FIG. 2 The process of changing a coupling sleeve on a taut overhead cable.

FIG. 3 In perspective, the nacelle according to the invention.

FIG. 4 The means for jettisoning the nacelle according to the invention.

FIGS. 5A & 5B The carriage or trolley used on board the nacelle according to the invention.

DETAILED DESCRIPTION OF AN EMBODIMENT OF THE INVENTION

Process according to the invention

Figure 1:
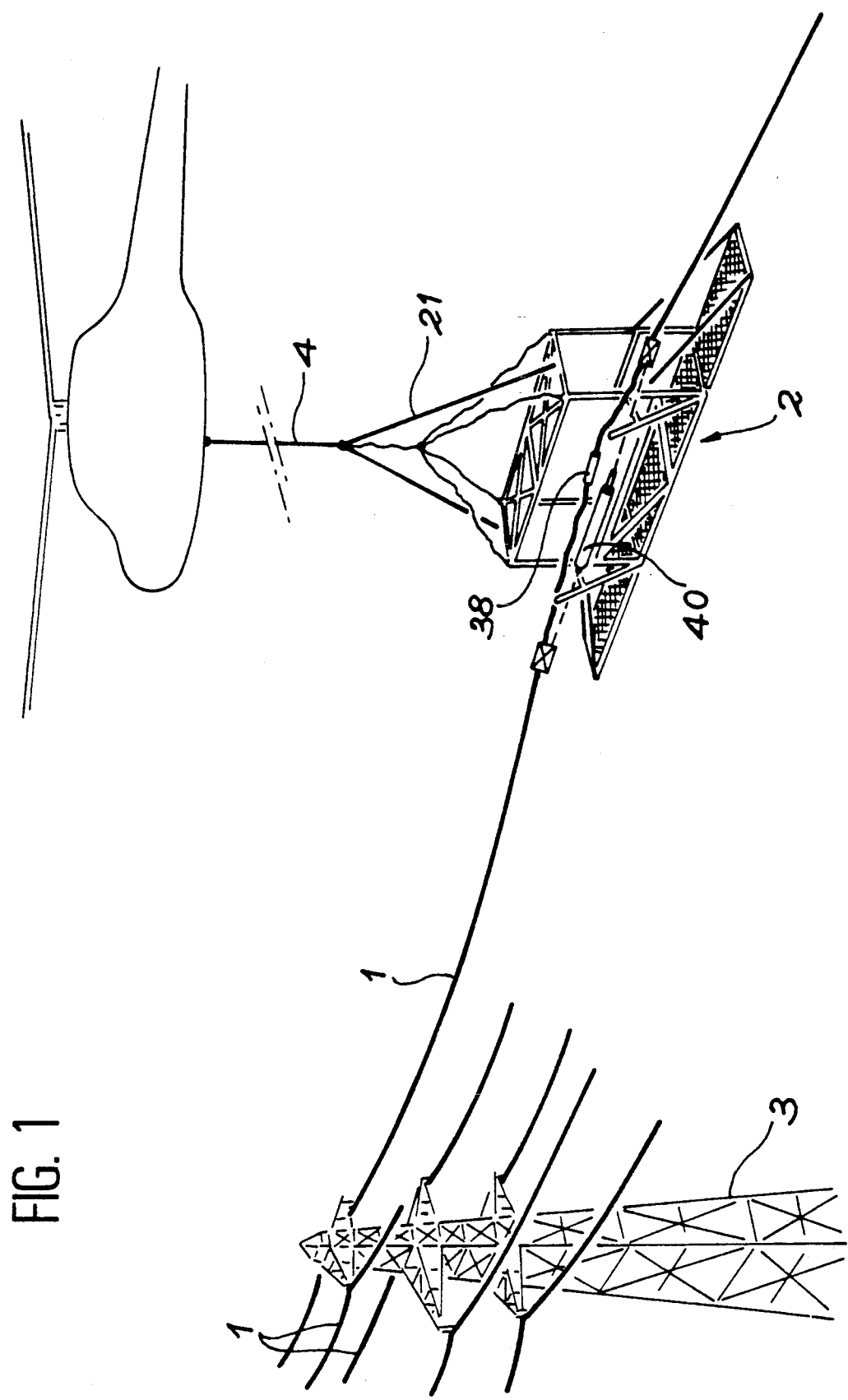

FIG. 1 illustrates the use of a nacelle 2 according to the invention for changing a coupling sleeve 38 of an overhead cable 1. The latter can form part of a bundle of cables 1 suspended on a series of pylons 3, within the electricity distribution network. The nacelle 2 is suspended on a helicopter by means of a rope 4 and is positioned alongside the sleeve 38.

The process for repairing an overhead cable 1 in conjunction with the nacelle according to the invention is clear. The nacelle 2 is carried by a helicopter, so as to instantaneously position one or more operators as close as possible to the coupling sleeve 38 to be changed. Such an operation can be carried out in about ten minutes.

Sleeve changing process

The first stage of this process is obviously to bring a nacelle 2 suspended on a helicopter close to the sleeve 38 on the cable 1. For this purpose the nacelle 2 has positioning means with respect to the overhead cables 1 and which will be described in greater detail hereinafter.

Figure 2:
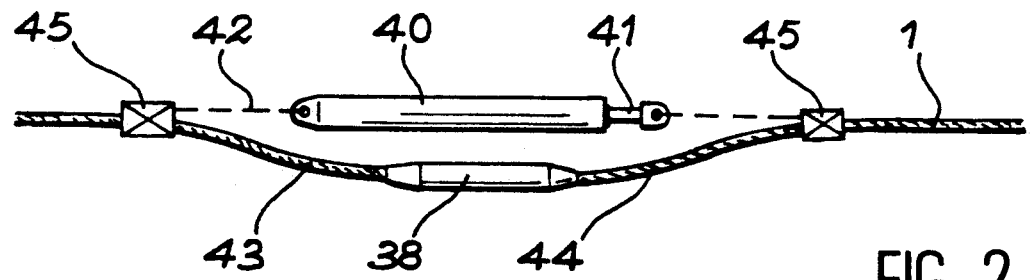

The nacelle 2 carrying a force take-up jack 40, the second stage consists, in the manner shown in FIG. 2, of short-circuiting the sleeve 38 on the cable 1. More precisely, this operation consists of fixing a first end 42 of the jack 40 to a first part 43 of the cable 1 placed on a first side of the sleeve 38. This fixing can take place with any random locking means 45 using jaws or by wedging a sling constituting the first end 42 of the jack 40 on the first cable part 43. The operation continues by fixing the second end of the jack 40, which is the mobile rod 41 thereof to the second part 44 of the cable 1 located at the other end of the sleeve 38. For this purpose use is made of fixing means 45 constituted by jaws or wedges. These first two operations can be carried out by operators carried in the nacelle 2, when the latter is placed alongside the sleeve 38 using the helicopter performing a stationary flight or hovering.

The third stage consists of tensioning the force take-up jack 40, i.e. by introducing the mobile rod 41 of said jack 40 into the body of the latter. For this purpose any random energy source can be carried on the nacelle 2, e.g. an explosion motor supplying a hydraulic reduction gear. This third stage has the effect of relaxing or detensioning the cable 1, particularly that part having the sleeve 38 and limited by fixing means 45.

The fourth operation consists of dismantling the sleeve 38 from the parts 43 and 44 of the cable 1 which it assembles.

The following stage consists of fitting the new sleeve 38 in place of the old one in an identical way and using tools which are known and used for carrying out this operation on the ground when not using a helicopter.

When the new sleeve 38 is in place and the two parts 43 and 44 of the cable 1 are again fixed to one another, the cable 1 can reassume its initial position, i.e. its taut state. This operation can take place by releasing the force take-up jack 40, i.e. by moving the rod 41 out of the jack body. The new sleeve 38 is then placed under tension and the force take-up jack 40 is no longer subject to the tension of the two sides of the cable 1.

The final operation consists of releasing the nacelle 2 from the overhead cable 1 and evacuating the nacelle 2 so that it can again be placed on the ground. During the replacement of the used sleeve 38 by the new sleeve, the force take-up jack 40 takes up all the tension of the overhead cable 1.

Nacelle

Figure 3:
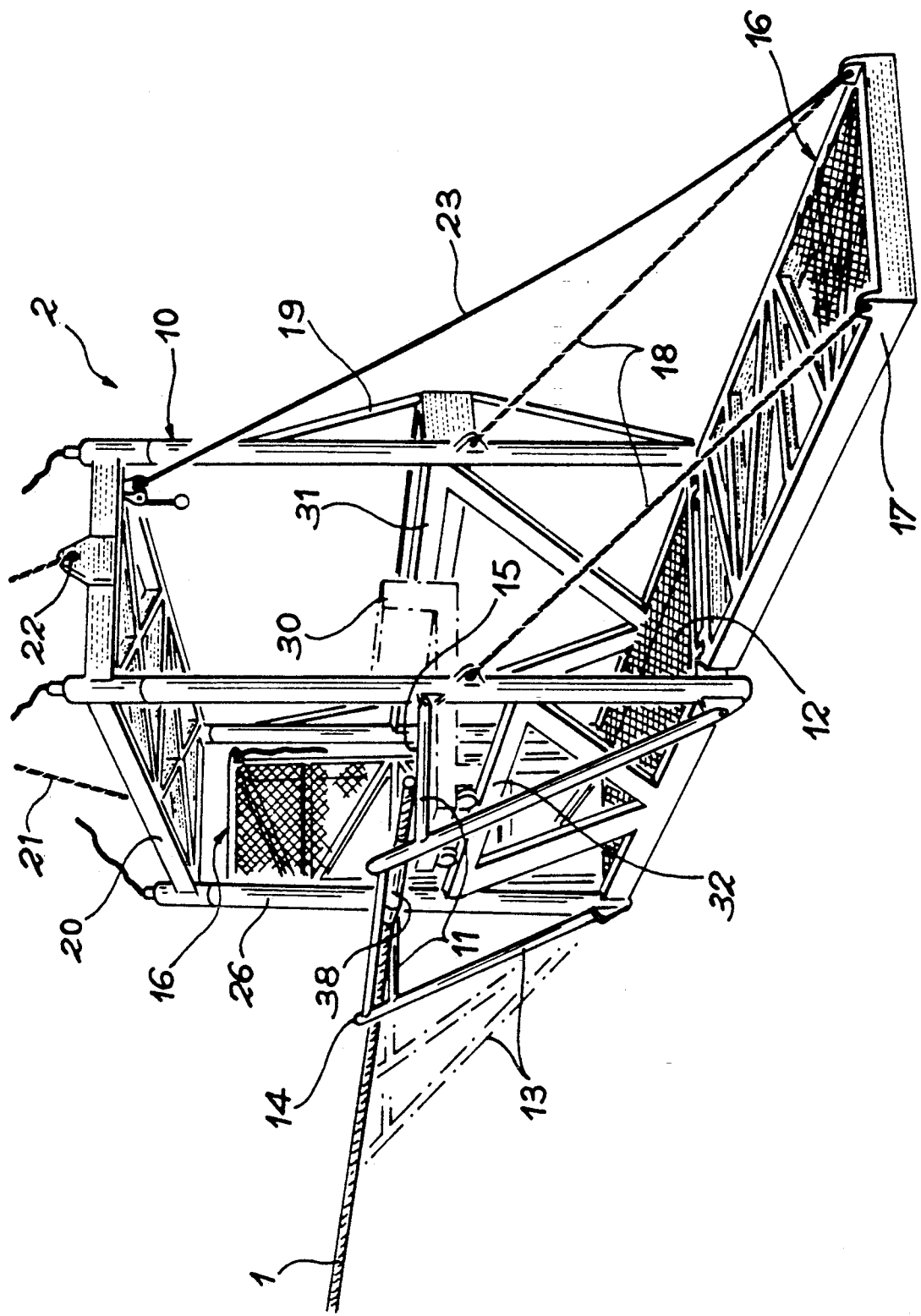

Such a process can only be performed if one or more operators are carried and suspended level with the overhead cable 1 by means of a nacelle or pod, as shown in FIG. 3. The latter is mainly constituted by a metal structure 10. Preferably, the latter has a parallelepipedic framework mainly constituted by a horizontal floor 12, four vertical posts 26 and an upper chassis 20. The floor 12 is formed either by a metal lattice, or by metal sheets suitable for enabling several operators to move within the cage defined by the metal structure 10.

Means for securing to the helicopter are provided on the metal structure 10 and in particular rings 22 on the upper chassis 20. To facilitate the positioning of such a nacelle with respect to the cable 1, the nacelle 2 according to the invention has positioning means with respect to said cable 1.

In FIG. 3 these positioning means are constituted by two guide bars 13 inclined relative to the metal structure 10. They therefore move away from the latter and their upper ends 14 can therefore be at several dozen centimeters from the vertical posts 26. The volume defined by these guide bars 13 and the corresponding vertical posts 26 must constitute a recess 15 for positioning the nacelle. The upper part 14 of said guide bars 13 has the function of trapping the overhead cable 1, when the nacelle is pulled slightly upwards below the cable 1. A horizontal positioning bar 11 connecting the guide bar 13 and the vertical posts 26 makes it possible to position the overhead cable 1 level with the working plane with respect to the operators carried by the nacelle 2. In a preferred manner, all the guide bars 13 are mounted so as to pivot with respect to the floor 12 of the nacelle 2.

In order to increase the working capacity of the operators carried and their field of action, the nacelle 2 has end walls 16 mounted so as to pivot relative to the floor 12 by means of their lower ends 17. As the end side walls 16 are advantageously constituted by metal sheets or lattices, they can constitute an extension of the floor 12 if positioned horizontally. Their fixing in this horizontal position can be obtained with the aid of positioning cables 18 connecting the tilted end of the end wall 16 to two vertical posts 26. The control of this tilting can be obtained by means of a manipulating cable 23 accessible from the interior of the metal structure 10 for one of the operators. Any other means for the mechanical locking of the end side walls 16 in their horizontal position can be adapted to the metal structure 10, so as to obtain the extension of the floor 12 of the nacelle 2.

Figure 5A:
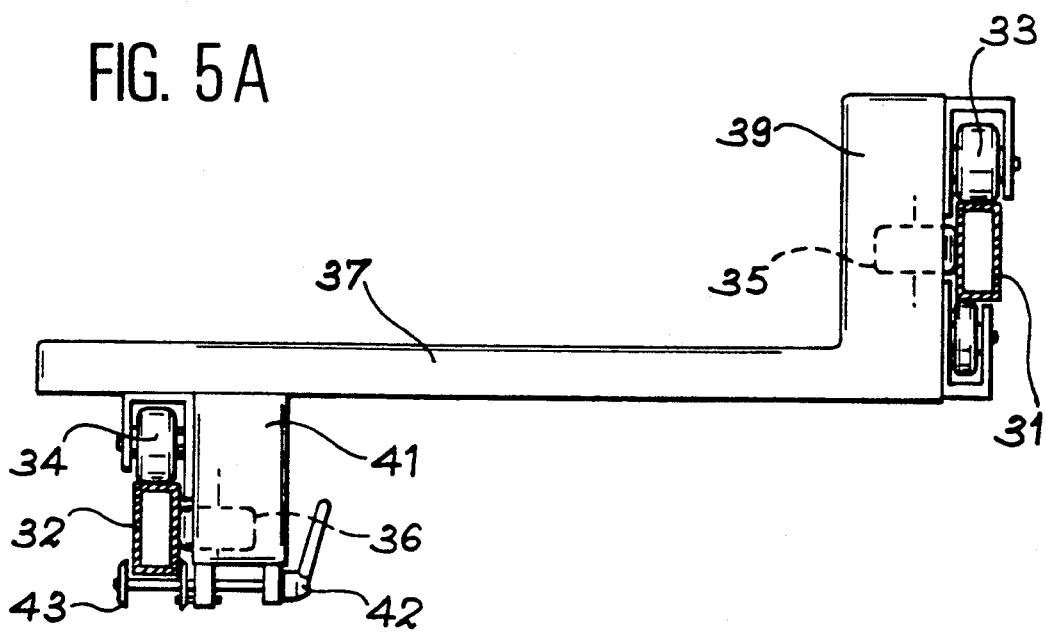
Figure 5B:
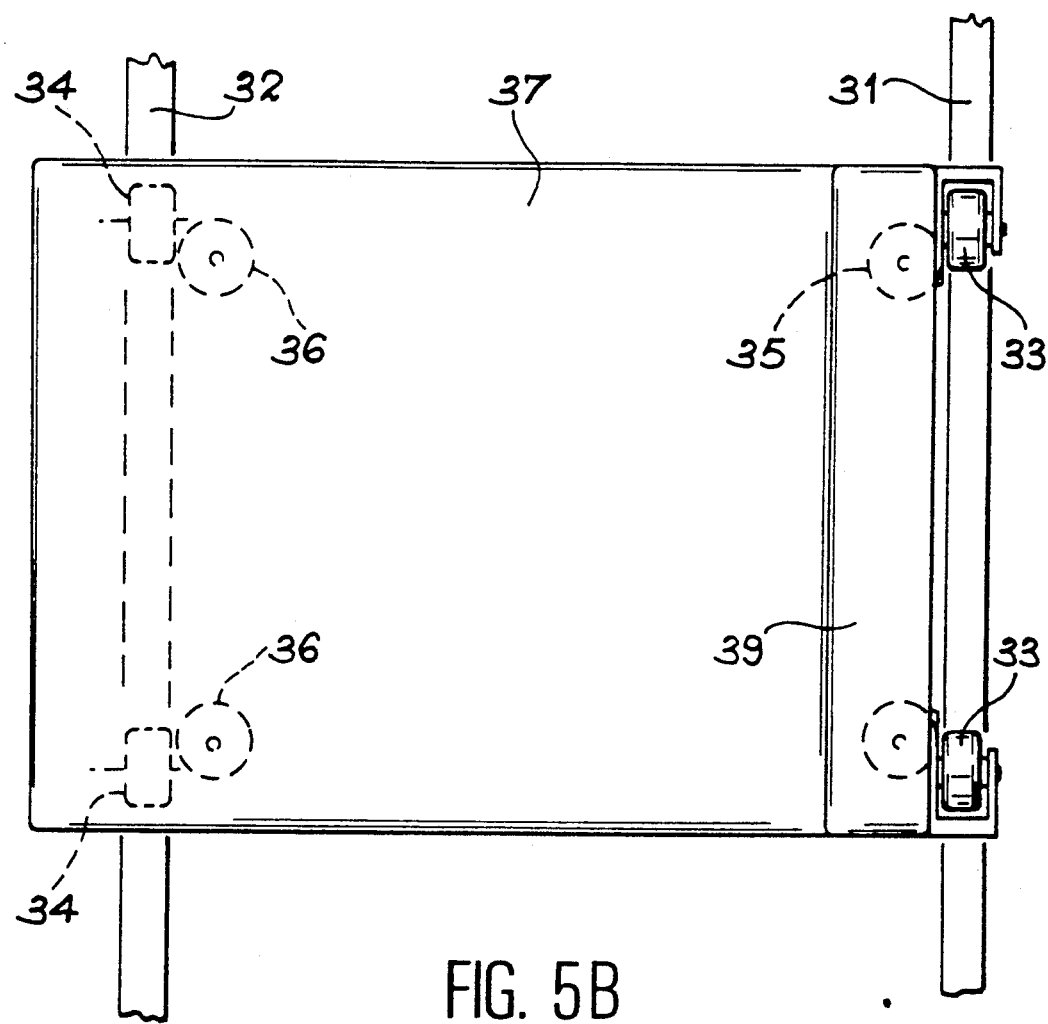

It is clear that when the two end side walls 16 have been opened out, the operators have a few more meters by which they can work along the overhead cable 1 with a view to changing the sleeve, as described hereinbefore and relative to FIG. 2. To complete this operation, the nacelle 2 according to the invention can be equipped with equipment especially intended for this purpose. Thus, the helicopter-carried nacelle 2 can have a carriage or trolley 30 mobile in horizontal translation within the metal structure 10 to facilitate the work of the operators, in this case the use of a force take-up jack 40. This trolley 30 is preferably positioned at a height of about one meter from the floor 12 level with the operator's hands. It is thus possible to use the horizontal elements 31, 32 of the metal structure 10 for fulfilling the function of a running path for the trolley 30. The latter is shown in greater detail in FIGS. 5A and 5B.

The mobile trolley is essentially constituted by a horizontal metal frame 37, at whose ends are placed respectively two rolling supports 39, 41. The positioning of these two supports 39, 41 takes place as a function of the position of the horizontal bars 31, 32 of the nacelle metal structure 10. Thus, the first horizontal bar 31, placed to the right, is higher than the second bar 32, placed to the left. On the two supports 39 and 41 are mounted so as to freely rotate on the one hand two pairs of rollers 33 and on the other two rollers 34. The rollers 33 are placed above and below the first horizontal bar 31 so as to engage round the same, so that the mobile trolley 30 is locked in vertical translation. The two rollers 34 are positioned so as to bear on the second horizontal bar 32 from the left-hand side. Therefore the trolley can run on the two horizontal bars 31, 32. Horizontal translation locking means are provided on the trolley. They can be constituted by a locking screw 42 acting on two washers 43 able to move towards one another and create significant friction on the side walls of the left-hand horizontal bar 32.

To enable the mobile trolley 30 to remain on the horizontal bars 31, 32, two guide rollers 35, 36 are mounted so as to rotate freely about two vertical axes in order to respectively bear against the two guide bars 31, 32.

Figure 4:
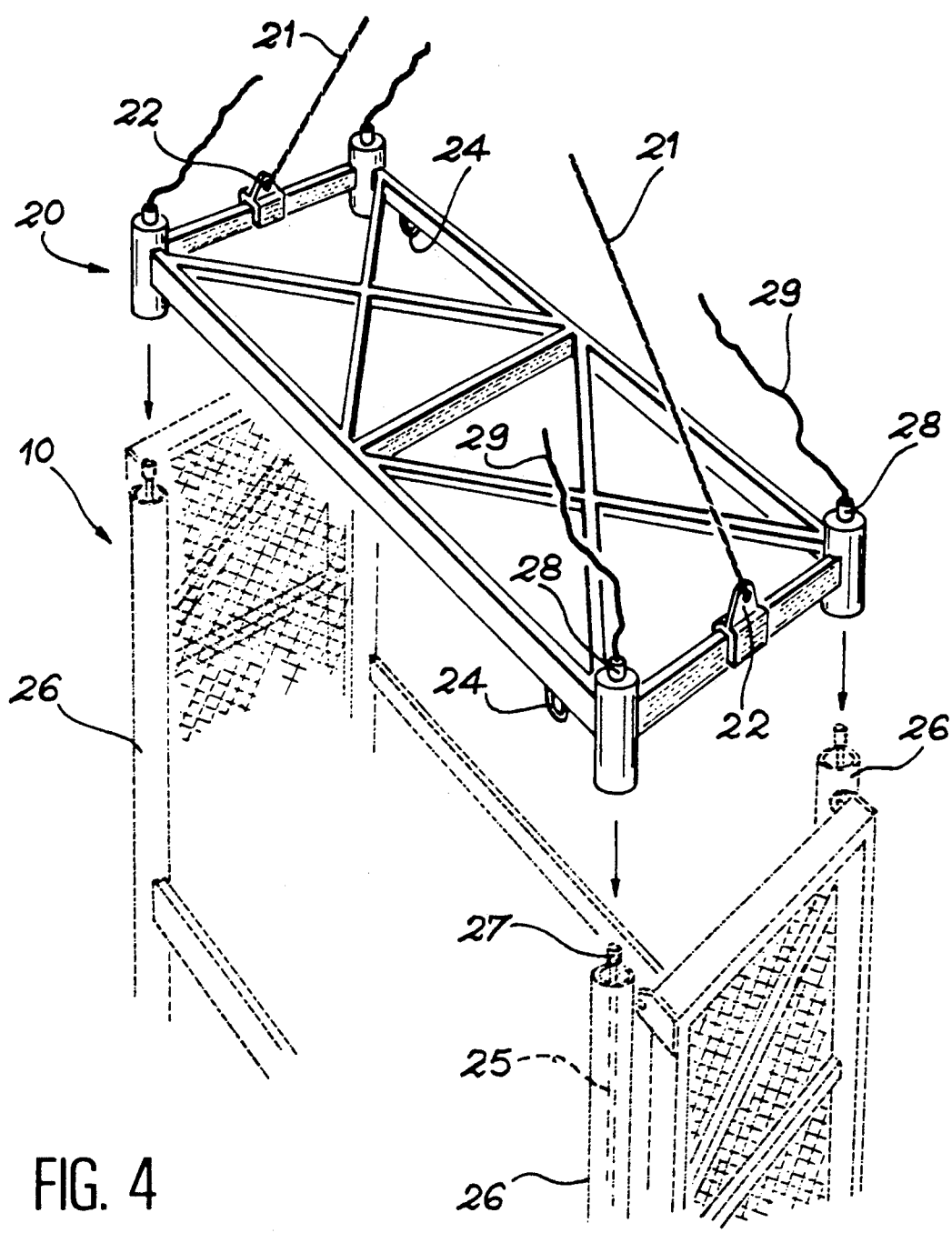

FIG. 4 illustrates the pyrotechnic means for separating the metal structure 10 from the upper trolley 20. Thus, with the nacelle 2 constantly suspended on the helicopter and transporting several operators, it is vital to provide a possibility of releasing the helicopter load, should an incident occur to the helicopter not enabling it to supply the power necessary for raising the nacelle. Thus, the metal structure 10 can be detached from the upper chassis 20 in a few seconds. These pyrotechnic separating means are preferably constituted by several tie rods 25 located within the vertical posts 26 of the metal structure 10. Their lower ends are fixed to the metal structure, whilst their upper ends 27, visible as a result of the exploded view of FIG. 4, are fixed to the upper chassis 20 and completed by explosive bolts 28. The latter are connected by pyrotechnic cords 29 to the helicopter, which can therefore at any random time control the separation of the nacelle 10 from the upper chassis 20.

In order to protect the operators against such a possibility, safety rings 24 are provided on the upper chassis 20. Therefore the operators can be fixed to said upper chassis 20 by attachment to one of the safety rings 24, e.g. using mountaineering equipment such as snap hooks. In this way, in the case of a failure of the helicopter engine or engines, it is possible to remove a significant weight from the latter, whilst being able to evacuate the operators suspended on the upper chassis 20.

Thus, by using the nacelle according to the invention, it is possible within an hour to carry out several coupling sleeve replacements on overhead cables, without it being necessary to place the cables on the ground and then raise them again once the change has taken place. Obviously each sleeve change requires a preparation with respect to the operations and equipment used for such operations or for the handling of live cables.

We claim:

1. Helicopter-carried nacelle (2) for the repair and maintenance of overhead cables (1), comprising a metal structure (10) having a floor (12) on which can move at least one operator, means for securing the metal structure (10) to the helicopter on which the nacelle (2) is suspended, means for positioning the nacelle (2) relative to an overhead cable (1), the nacelle being continuously suspended on the helicopter, an upper chassis (20), rings (22) constituting the securing means fixed to the upper chassis (20) and in which can be placed helicopter rope slings (21), pyrotechnic means for separating the metal structure (10) from the upper chassis (20) and means (24) for securing the operator to the upper chassis (20) in a case of jettisoning the metal structure (10).

2. Nacelle (2) according to claim 1, characterized in that the positioning means are constituted by at least one upwardly inclined guide bar (13) positioned laterally with respect to the metal structure (10) to bring the cable (1) to the bottom of a recess (14) by the helicopter pulling vertically on the nacelle (2).

3. Nacelle (2) according to claims 1 or 2, characterized in that the metal structure (10) is parallelepipedic, with at least one end side wall (16) mounted so as to pivot at its lower end (17) so that it can be placed in the extension of the floor (12) in order to extend the latter.

4. Nacelle (2) according to claim 3, characterized in that it comprises positioning cables (18) for locking in a horizontal position the end side walls (16) with respect to the metal structure (10).

5. Nacelle (2) according to claim 1, characterized in that the metal structure (10) is fixed to the upper chassis (20) by several tie rods (25) placed within vertical posts (26) of the metal structure (10) and fixed to the metal structure by their lower ends and whereof the upper end (27) of each tie rod is fixed in an angle of the chassis (20) and equipped with a pyrotechnic bolt (28) forming part of the pyrotechnic separating means.

6. Nacelle (2) according to claim 5, characterized in that the pyrotechnic separation means are completed by pyrotechnic cords (29) connected to the helicopter to control the operation of the pyrotechnic bolts (28).

7. Nacelle (2) according to claim 1, characterized in that it comprises a mobile carriage or trolley (30) displaceable horizontally in the metal structure (20) and serving as a work table on the cable (1) for the operators.

* * * * *